US011805128B2

(12) United States Patent
Schuberth

(10) Patent No.: US 11,805,128 B2
(45) Date of Patent: Oct. 31, 2023

(54) METHODS AND AUTHENTICATION SERVER FOR AUTHENTICATION OF USERS REQUESTING ACCESS TO A RESTRICTED DATA RESOURCE

(71) Applicant: Mideye AB, Stockholm (SE)

(72) Inventor: Ulf Schuberth, Sollentuna (SE)

(73) Assignee: Mideye AB, Stockholm (SE)

(*) Notice: Subject to any disclaimer, the term of this patent is extended or adjusted under 35 U.S.C. 154(b) by 325 days.

(21) Appl. No.: 17/463,743

(22) Filed: Sep. 1, 2021

(65) Prior Publication Data
US 2022/0078193 A1   Mar. 10, 2022

(30) Foreign Application Priority Data
Sep. 4, 2020   (SE) .................... 2051043-4

(51) Int. Cl.
G06F 7/04      (2006.01)
H04L 9/40      (2022.01)
G06F 21/31     (2013.01)

(52) U.S. Cl.
CPC ............ *H04L 63/102* (2013.01); *G06F 21/31* (2013.01); *H04L 63/0272* (2013.01);
(Continued)

(58) Field of Classification Search
CPC ............... H04L 63/083; H04L 63/0876; H04L 63/0884; H04L 63/0272; H04L 63/10;
(Continued)

(56) References Cited

U.S. PATENT DOCUMENTS 5,668,876 A      9/1997  Falk et al.
9,419,968 B1 *   8/2016  Pei .................... G06F 21/31
(Continued)

FOREIGN PATENT DOCUMENTS

WO    2007089179 A1    8/2007

OTHER PUBLICATIONS

Chen et al, New Authentication Method for Mobile Centric Communications, IEEE, Jun. 1, 2005, pp. 1-5. (Year: 2005).*
(Continued)

*Primary Examiner* — Philip J Chea
*Assistant Examiner* — Jenise E Jackson
(74) *Attorney, Agent, or Firm* — Tucker Ellis LLP

(57) ABSTRACT

Disclosed is a method and authentication server for authentication of users requesting access to a restricted data resource from a communication device. Communication between the communication device and the authentication server passes via an access server, and the RADIUS protocol is used for the communication between the authentication server and the access server. After validating password and username entered by a user, the authentication server sends a request to the communication device to enter an authentication device ID. When receiving an entered authentication device ID, the authentication server performs authentication of the user based on a second authentication procedure using the received authentication device ID and when the second authentication procedure is successful, the user is granted access to the restricted data resource. The user can therefore decide which of a plurality of different authentication devices to use.

9 Claims, 6 Drawing Sheets

(52) U.S. Cl.
CPC ........ *H04L 63/083* (2013.01); *H04L 63/0876* (2013.01); *H04L 63/0884* (2013.01); *G06F 2221/2103* (2013.01); *H04L 63/0838* (2013.01); *H04L 2463/082* (2013.01)

(58) Field of Classification Search
CPC . H04L 63/102; H04L 63/0838; H04L 63/101; H04L 9/0863; G06F 21/31; G06F 21/44; G06F 21/552
See application file for complete search history.

(56) References Cited

U.S. PATENT DOCUMENTS

| | | | | |
|---|---|---|---|---|
| 10,547,599 | B1* | 1/2020 | Mehta | H04L 63/08 |
| 10,552,823 | B1 | 2/2020 | Woodward et al. | |
| 2006/0094403 | A1* | 5/2006 | Norefors | G06F 21/35 |
| | | | | 455/411 |
| 2008/0077592 | A1* | 3/2008 | Brodie | H04L 63/08 |
| | | | | 707/999.009 |
| 2012/0144461 | A1* | 6/2012 | Rathbun | G06Q 20/4014 |
| | | | | 726/5 |
| 2013/0212387 | A1* | 8/2013 | Oberheide | H04L 9/32 |
| | | | | 713/168 |
| 2014/0020073 | A1* | 1/2014 | Ronda | H04L 63/0853 |
| | | | | 726/7 |
| 2014/0123231 | A1* | 5/2014 | Low | H04L 63/0892 |
| | | | | 726/4 |
| 2014/0189808 | A1* | 7/2014 | Mahaffey | G06F 21/31 |
| | | | | 726/4 |
| 2016/0149894 | A1 | 5/2016 | Jneid et al. | |
| 2016/0366589 | A1* | 12/2016 | Jean | H04L 63/0892 |
| 2017/0034168 | A1* | 2/2017 | Wilson | H04L 63/0807 |
| 2017/0346815 | A1 | 11/2017 | Andrews et al. | |
| 2019/0124063 | A1* | 4/2019 | Cui | H04L 63/0853 |
| 2020/0128000 | A1 | 4/2020 | Pawar et al. | |
| 2020/0382485 | A1* | 12/2020 | Milton | G06F 21/43 |

OTHER PUBLICATIONS

Pavlovski et al, Unified Framework for Multifactor Authentication, IEEE, Apr. 29, 2015, pp. 209-213. (Year: 2015).*

Rigney et al., "Remote Authentication Dial In User Service (RADIUS)," Network Working Group Request for Comments: 2058, Jan. 1997, 64 pages.

* cited by examiner

METHODS AND AUTHENTICATION SERVER FOR AUTHENTICATION OF USERS REQUESTING ACCESS TO A RESTRICTED DATA RESOURCE

RELATED APPLICATION DATA

This application claims the benefit of Swedish Patent Application No. 2051043-4, filed Sep. 4, 2020, the disclosure of which is incorporated herein by reference in its entirety.

TECHNICAL FIELD

The present disclosure relates generally to methods and authentication servers for authentication of users requesting access to a restricted data resource. The present disclosure further relates to computer programs corresponding to the above methods and authentication servers.

BACKGROUND

A restricted data resource aka an electronically restricted resource is defined as a data resource to which access is restricted. In other words, only authorized users are allowed to access data in the restricted data resource. An example of such a restricted data resource is a virtual private network (VPN). To prevent unauthorized access to restricted data resources such as VPNs, there are different procedures for authenticating users trying to access the VPN from a communication device. A user has registered a user account for the VPN. One such authentication procedure is a two-step procedure where a VPN client, which may be installed on a user's communication device, e.g. a computer, or in a web browser data program or any other data program, prompts the user to enter a username and password for entering the VPN. The username and password entered by the user in the VPN client is forwarded to a VPN access server, e.g. a VPN Gateway, which in turn forwards the entered username and password to a back-end authentication server. The back-end authentication server is situated in the VPN. After the back-end authentication server has verified that the username and password matches the username and password registered for the account, the VPN client on the user's computer prompts the user with an access challenge, which requests the user to enter an additional one-time password (OTP). The OTP is sent to an authentication device, which identifier (ID) is pre-registered in the user account. The OTP can be sent from the authentication server to another communication device of the user, such as the user's mobile phone via a mobile communication network, provided that it is the user's mobile phone ID that is pre-registered in the user account. The user then reads the OTP from the display of the mobile phone and enters the OTP into the computer. The back-end authentication server then checks that the entered OTP matches the sent OTP. Hereby a strong two-step authentication procedure is achieved. Examples of such authentication procedures are described in U.S. Pat. No. 5,668,876 A, and in WO 2007/089179, the latter originating from the present applicant.

As an alternative to receiving the OTP at the user's mobile phone via the mobile communication network, the user can obtain the OTP from a software application installed on the user's mobile phone, so called soft authentication token, or from a dedicated token card, so called hard authentication token. With such methods, the OTP is calculated by the authentication token from a secret key shared between the authentication token and the authentication server. The authentication token displays the calculated OTP to the user and the user manually enters the calculated OTP in his/her computer. An authentication token ID referring to the specific soft or hard authentication token that the user uses, must then be pre-registered in the user account.

In another alternative to performing the second step of the authentication procedure with OTPs, the user can accept the login in a software application installed on the user's mobile phone, without having to enter an OTP in the VPN client on the computer. The software application is user-specific, i.e. it has an authentication token/device ID which is pre-registered in the user account. The accept message is then transferred back to the authentication server via the Internet connection of the mobile phone.

As mentioned in prior art WO 2007/089179, the communication between the VPN access server and the back-end authentication server may be performed via a networking protocol called Remote Authentication Dial-In User Services (RADIUS). For this reason, the back-end authentication server has an access server interface module by which access servers can be interfaced. The RADIUS protocol is described in "Remote Authentication Dial In User Service (RADIUS)", by Rigney et al, Internet Engineering Task Force (IETF) Network Working Group, Request for Comments (RFC) 2865, published June 2000. When using RADIUS, the back-end authentication server acts as a RADIUS server and the VPN access server acts as a RADIUS client. The challenge-response mechanism by which the RADIUS client-server communication takes place is described in sections 2.1 and 4.4 of the RFC 2865. RADIUS is used for many network services today for Authentication, Authorization, and Accounting management for users who connect and use the network service.

There are use cases where a VPN user account is shared between more than one user. With a shared account, several users log in with the same username and password. Such a shared account may be a company account that is used by the company's employees to perform remote support to customers on behalf of the company. If the above described prior art two-step authentication procedure is used for such a shared account, a problem arises how to perform the second step of the authentication, especially when the RADIUS protocol is used. In the second step of the authentication procedure, an OTP or similar message is sent to the authentication device ID pre-registered for the account.

Multiple authentication device IDs can be registered for one user account, but if the authentication server is to accept OTPs from multiple authentication tokens and/or mobile phones, security would be lower. Further, if network-delivered OTPs are to be used, this would lead to sending an OTP to all the registered multiple authentication devices for the account, i.e. also to authentication devices that are not involved in the current login. Apart from the lower security, it would be quite annoying for a person not being involved in the current login to receive OTPs that are irrelevant for him/her.

One alternative is to have a single mobile phone or authentication token for obtaining OTPs, or accepting login in a software app. Such a single mobile phone or authentication token is then shared among the several users that share the account. However, this is cumbersome to administer. If the single mobile phone/authentication token, instead of being circulated among users, is in the possession of a single trusted person, that person would need to be involved in every login, which is also cumbersome to administer.

Alternatively, to keep security on a high level, a trusted person may be appointed as supervisor. The supervisor would then receive the one-time password from the authentication server and distribute the one-time password to the one of the trusted users of the account that is currently trying to log-in. Such a procedure would however also be cumbersome as it relies on the supervisor being active and having control of who is currently trying to log-in. Another flaw is that if the supervisor is not present, the one of the trusted users that is trying to log-in must wait for the password from the supervisor.

Consequently, as shown above, there is a need for a different procedure for achieving strong authentication when accessing restricted data resources such as VPNs with shared user accounts, a procedure that needs to be secure at the same time as it is easy to use for the users of the shared user account. Further, the procedure should be compatible with the RADIUS protocol.

SUMMARY

It is an object of the invention to address at least some of the problems and issues outlined above. It is possible to achieve these objects and others by using methods, authentication servers and communication devices as defined in the attached independent claims.

A way of mitigating the problems indicated above with multiple phones/tokens for such shared user accounts that may be contemplated is whether the restricted data resource can provide the user an option in the initial login prompt to indicate a user-specific identifier, in addition to username and password. However, the RADIUS protocol offers limited possibilities to transfer additional user information, beyond username and password, to the backend authentication server in the initial access request. Consequently, if the RADIUS protocol is to be used, another procedure has to be invented.

Instead, and according to embodiments of the invention, the existing two-step procedures are improved by first storing for the shared user account, IDs of authentication devices that are allowed to be used for authentication. Further, in response to the first authentication step, i.e. the authentication server authorizing the username and password entered by the user, the authentication server sends a request to the communication device to enter the ID of the authentication device that is to be used for the second authentication procedure. Such a request can be sent as an access challenge according to the RADIUS challenge-response mechanism. In response to the request, the user enters the ID of its authentication device, e.g. its mobile phone number, on its communication device and the communication device sends the entered authentication device ID to the access server and further to the authentication server. The authentication server checks if the received authentication device ID is among the IDs of authentication devices registered for the account being used. If so, the authentication server utilizes the received authentication device ID for the second authentication procedure, such as for sending an OTP, and the authentication proceeds as in any of the prior art procedures.

By such a method, a secure two-step authentication is achieved also for accounts that may be shared by a plurality of users. At the same time, the authentication procedure is still compatible with the standardized RADIUS protocol. Thereby, restricted data resources already using the RADIUS protocol can implement this method without having to make any changes in the restricted data resource. The authentication method is especially useful for accounts that are shared by several users, but it may as well be used for accounts that only has one user. For example, the user may have more than one authentication device and may wish to choose whether to use e.g. his/her authentication token or his/her mobile phone as authentication device.

Details of embodiments of the present invention will be described in the following claims and the detailed description.

BRIEF DESCRIPTION OF DRAWINGS

The solution will now be described in more detail by means of exemplary embodiments and with reference to the accompanying drawings, in which.

DETAILED DESCRIPTION

Figure 1:
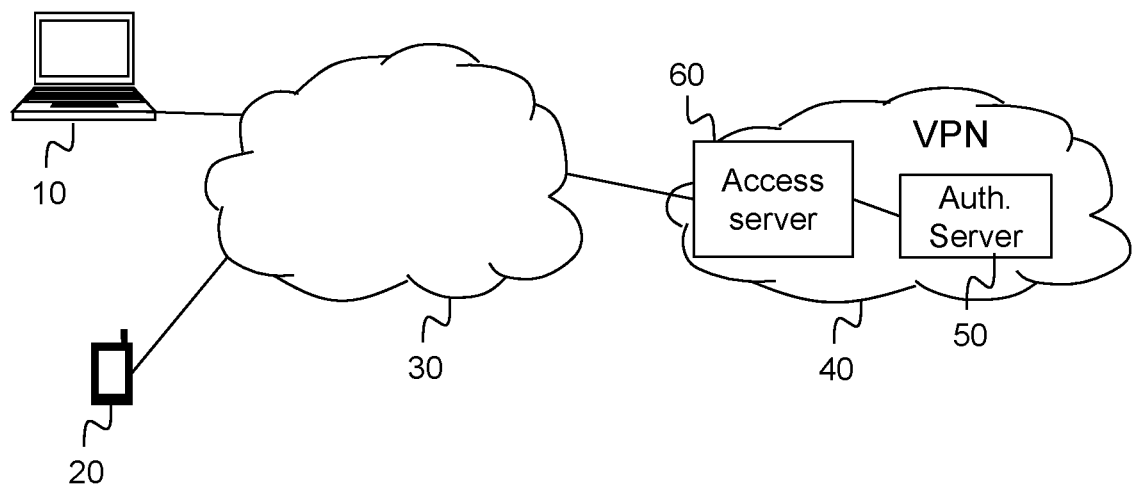
FIG. 1 is a block diagram of a communication scenario or architecture in which the present invention maybe used.

FIG. 1 shows a communication scenario in which embodiments of the present invention may be used. A user of a communication device 10, here exemplified by a computer, would like to log-in to a restricted data resource 40, here exemplified by a VPN. The communication device 10 may be any wired or wireless communication device, for example a tablet or a mobile phone as well as a computer. The VPN 40 has an authentication server 50. The VPN 40 further comprises an access server 60 through which communication between outside of the VPN 40 and the authentication server 50 passes, e.g. communication between the communication device 10 and the authentication server 50. In other words, the access server 60 controls access to the VPN 40. The communication device 10 communicates with the access server 60 and the authentication server 50 via a regular communication network 30. The user further has access to an authentication device 20, here exemplified by a mobile phone. Alternatively, the authentication device 20 may be a security token. A security token is a peripheral device used to gain access to a restricted resource. The token is used in addition to or in place of a password. It acts like an electronic key to access the electronically restricted resource. The authentication device 20 may also be any other type of communication device that may be used as an authentication device, such as another computer, a tablet etc. Still alternatively, the authentication device 20 may be the same device as the communication device, e.g. realized as a software authentication application on the communication device 10. The authentication device 20, when it has communication abilities, communicates via the regular communication network 30. The regular communication network 30 may be any wireline or wireless communication network or a combination of both.

Figure 2:
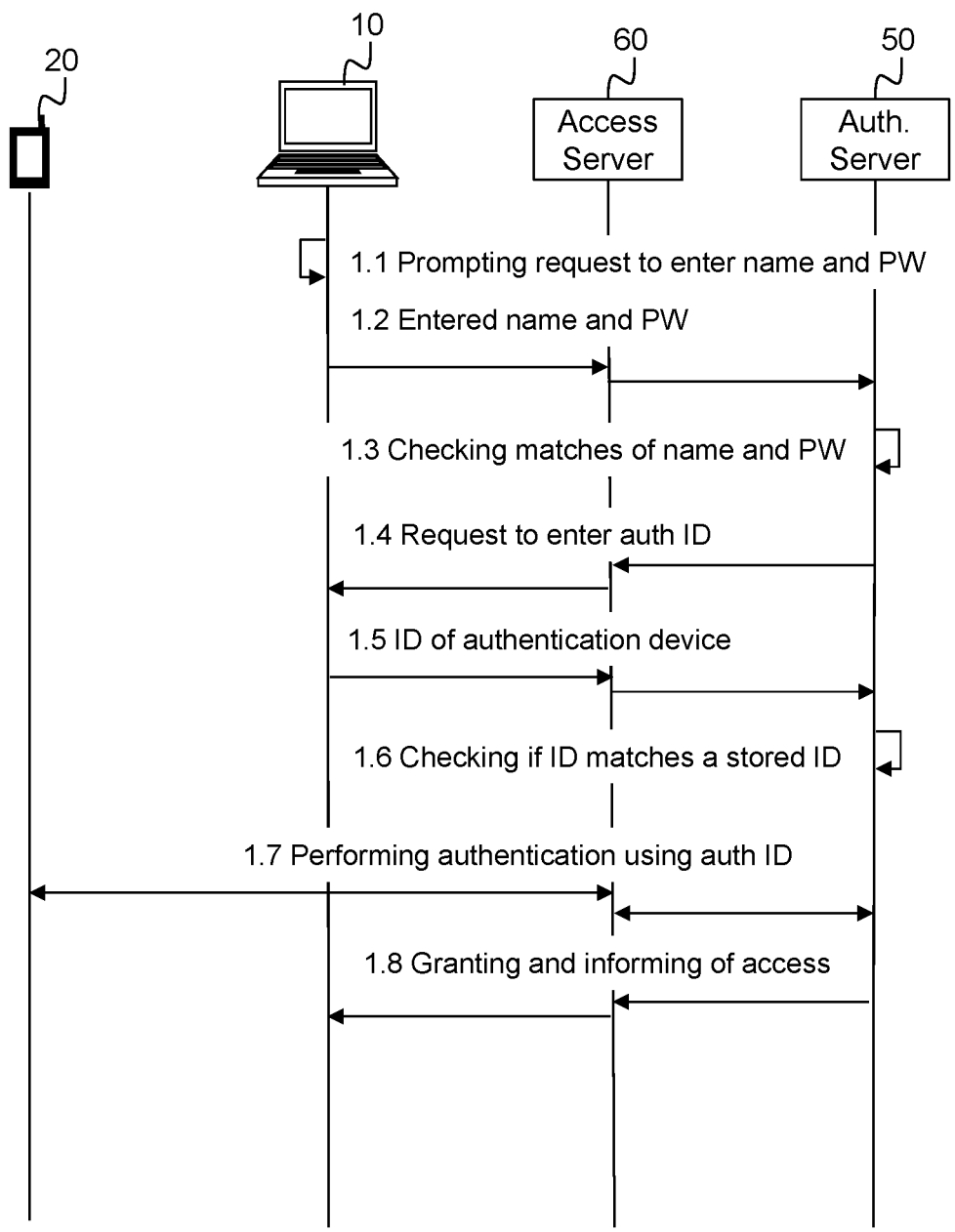
FIG. 2 is a signaling diagram illustrating a method according to possible embodiments of the invention.

FIG. 2 describes an embodiment of a method according to the invention for a system as in FIG. 1. When a user of the communication device 10, in the FIG. 2 description shown as and called computer, reveals an interest to log-in to the restricted data resource, here exemplified by a VPN, the method starts by the computer 10, e.g. a VPN client on the computer prompting 1.1 a request on the display of the computer 10, the request being a request to the user of the computer to enter a username and password. After the user has entered the username and password using an input unit of the computer 10, the computer sends 1.2 the entered username and password to the access server 60 of the VPN, which relays the entered user name and password to the authentication server 50. The communication between the access server 60 and the authentication server 50 is performed using the RADIUS communication protocol. The access server 60 performs any necessary adaptions of communication received from outside the restricted data resource so that the communication from the restricted data resource is adapted to the RADIUS protocol. For example, the access server 60 performs any necessary translations between the RADIUS protocol and a communication protocol used outside the restricted data resource, i.e. a communication protocol used by the communication device 10, especially a client of the communication device 10.

The authentication server 50 then checks 1.3 whether the entered username matches any stored username, and if so, whether the entered password matches a password stored for the matching username. "Matching" here means that the stored password is identical to the password entered by the user. When such a match of password is found for an identified username, the authentication server 50 sends a request 1.4 to the computer 10 via the access server 60 to enter an identification number (ID) of an authentication device 20 that the user wants to use for authentication purposes. After the user has entered the ID of the authentication device that the user wants to use, in this example the number of his/her mobile phone 20, in the input unit of the computer 10, the computer sends 1.5 the ID of the mobile phone 20 to the authentication server 50 via the access server 60. The authentication server 50 then checks 1.6 whether the received ID of the mobile phone 20 matches any of a plurality of stored IDs for authentication devices that may be used for this username. When such a match is found, the authentication server 50 performs or at least initiates 1.7 a second authentication procedure for the log-in, using the authentication ID received, i.e. in this example the ID of the user's mobile phone 20. The second authentication procedure may be performed in many different ways, out of which some will be presented further down. The inventive part does not primary lie in this second authentication procedure. When the second authentication procedure is successful, the authentication server 50 grants 1.8 the user access to the restricted data resource e.g. at least a part of a VPN and informs the communication device 10 of the grant.

One example of a second authentication procedure is that the authentication server 50 sends, via the access server 60, a secondary password, in this example a one-time password (OTP), however any other kind of secondary password may apply, to the mobile phone 20 identified by the authentication device ID. The mobile phone 20 presents the OTP for the user at its display and the user reads the OTP and enters the OTP in his/her computer 10. Thereafter, the computer 10 sends the OTP via the access server 60 to the authentication server 50 that determines if it is the same OTP that was sent out. If this is the case, access to the VPN is granted for the user of the communication device 10. According to a variant of the second authentication procedure, the authentication server 50 sends a pre-OTP to the mobile phone 20 via the access server 60 and the mobile phone 20 uses the pre-OTP to generate the OTP that the user enters in its computer 10 and the computer sends to the authentication server 50. Then the authentication server 50 compares the entered OTP with an OTP that the authentication server generates itself from the pre-OTP in the same way as the mobile phone did. According to a second embodiment, the authentication device 20 is an authentication token. Then the authentication server 50 does not need to send any OTP. Instead, the authentication token obtains the OTP from an encryption key that has been shared between the authentication server 50 and the authentication token, and the authentication token presents the OTP to the user using its display. The user enters its OTP in the computer 10 in response to a request to enter an OTP displayed by the computer. According to a variant, the authentication token obtains a pre-OTP and uses the pre-OTP to generate the OTP that the user enters, as for the variant described above.

Figure 3:
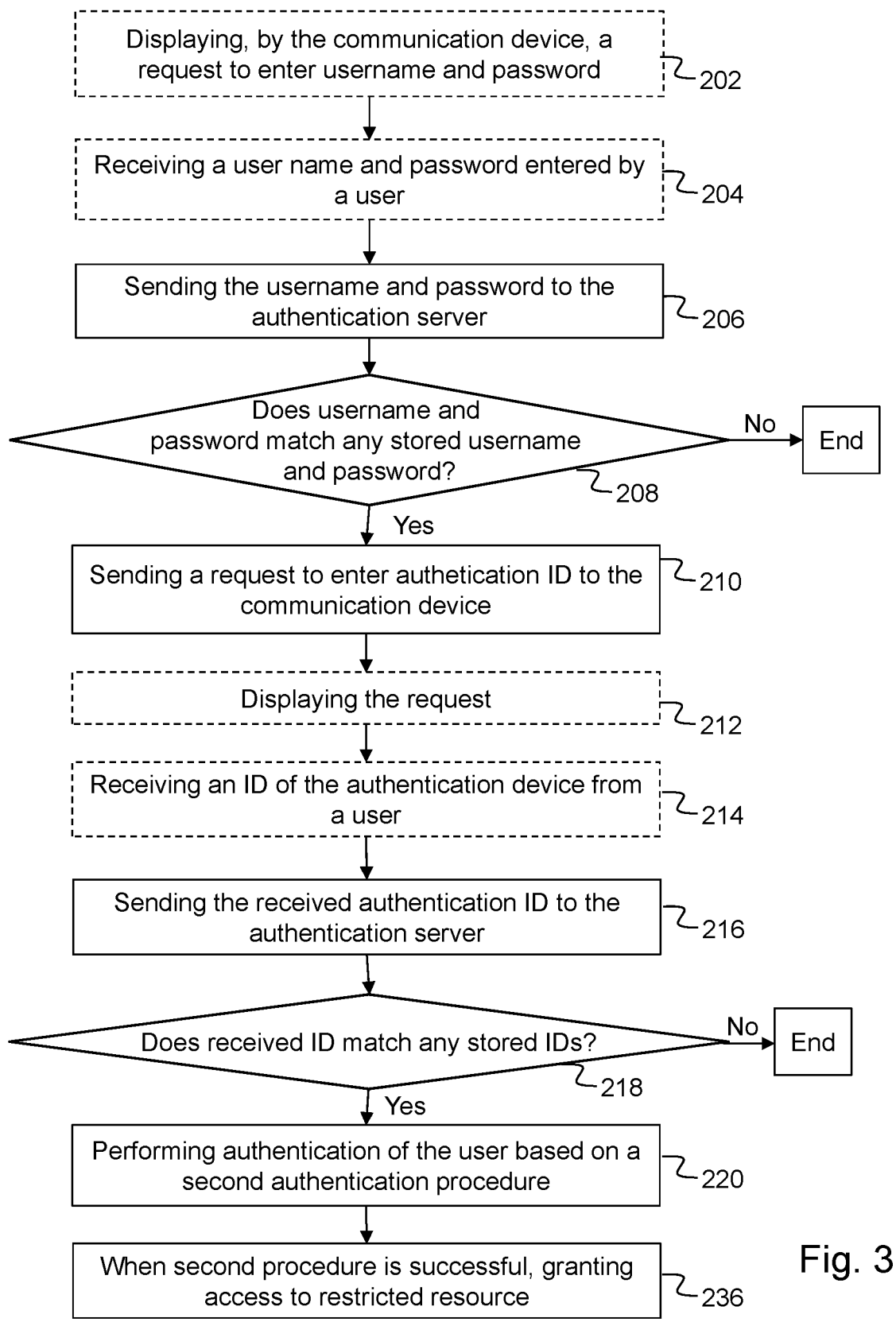
FIG. 3 is a flow chart illustrating a method performed by a system, according to possible embodiments.

FIG. 3, in conjunction with FIG. 1, describes a method performed by a system for authentication of users requesting access to a restricted data resource 40. The system comprises an authentication server 50 situated in the restricted data resource 40, an access server 60, a communication device 10, and an authentication device 20. Communication between the communication device 10 and the authentication server 50 passes via the access server 60. Further, the RADIUS protocol is used at least for the communication between the authentication server 50 and the access server 60. The method comprises sending 206, by the communication device 10 to the authentication server 50, a username and a password received from a user of the communication device in response to a request to enter a username and password for accessing the restricted data resource 40, and triggering checking 208, by the authentication server 50, whether the username received from the communication device matches a stored username of any account of the restricted data resource and whether the password received from the communication device matches a stored password for the account matching the username entered by the communication device. The method further comprises sending 210, by the authentication server 50 to the communication device 10, and when the password received from the communication device matches the stored password for the account matching the username received from the communication device, a request to enter an authentication device ID, and sending 216, by the communication device 10 to the authentication server 50, an authentication device ID received from the user in response to the request to enter an authentication device ID. The method further comprises checking 218, by the authentication server 50, whether the authentication device ID received from the communication device matches any of a plurality of stored authentication device IDs for the account matching the username received from the communication device, and performing authentication 220 of the user based on a second authentication procedure using the authentication device ID received from the communication device, when the authentication device ID received from the communication device matches any of the plurality of stored authentication device IDs for the account matching the user name received from the communication device. Further, when the second authentication procedure is successful, granting 236 by the authentication server 50, the user access to the restricted data resource.

By such a method it is possible for the authentication server 50 to send a request to the communication device 10 of which authentication device 20 of a plurality of registered authentication devices that is to be used for the second authentication procedure, receiving an ID of such an authentication device and perform the second authentication procedure using this authentication device ID. This is possible while still using the established RADIUS protocol for the communication between the access server 60 and the authentication server.

In the method described above, the restricted data resource may be e.g. a VPN or any digitally published content. The access server 60 provides access to the restricted data resource. Further, the access server performs any necessary translation between the RADIUS protocol and a communication protocol used between the access server and the communication device and/or authentication device, i.e. outside the restricted data resource. The access server may be a gateway. The authentication device 20 and the communication device 10 may be different devices or the same device. The request to enter a username and password on the communication device is triggered by e.g. a client at the communication device prompting the user to enter username and password. The username and password are received from the user via a user input interface of the communication device. "Triggering checking" 208 signifies that either the authentication server itself checks whether the entered username and password matches any stored username and password, or alternatively the authentication server triggers another node of the restricted data resource having access to user data to perform this username and password check, such as a Lightweight Directory Access Protocol (LDAP) catalog e.g. an Active Directory. For the second authentication procedure, any possible procedure may be used as long as the authentication device ID is used. Further down, an example of this second authentication procedure is shown. "The RADIUS protocol" signifies any version of the IETF RADIUS communication protocol such as the version published in RFC 2865 or any later or earlier version.

According to an embodiment, the request to enter an authentication device ID is sent 210 by the authentication server as an Access challenge according to a challenge-response mechanism of the RADIUS protocol. Further, the authentication device ID sent 216 by the communication device to the authentication server is received by the authentication server as a Challenge response to the Access challenge, according to the RADIUS challenge-response mechanism.

Since the Challenge-Response mechanism is a standardized part of the RADIUS protocol, it means the method can be implemented without requiring adaptations neither in the access server 60 nor in the communication device 10.

The authentication device ID is sent from the communication device to the authentication server in the response to the Access challenge. I.e. the Challenge response in 216 is a response to the Access challenge in 210. The RADIUS challenge-response mechanism is described in e.g. RFC 2865. Further, according to an embodiment, the RADIUS challenge-response mechanism work according to the following: An Access challenge comprises a prompt with a text string and a box, e.g. password attribute or field, where a response is to be inserted by the user. In the text string of the Access challenge, the user is prompted with the request to enter the ID of the authentication device it wants to use. In the box, the user enters the authentication device ID, and the entered authentication device ID is sent as Challenge response to the authentication server 50.

Further, in case any of the checking steps 208 or 218 would turn out negatively, i.e. if there would not be any match, the method may, as shown in FIG. 3, end, or the method may restart. However, it may also be possible that the user gets another try. For step 208, in case the entered username would not match any stored usernames, or the username would match a stored username but the entered password for the stored username would not match the stored password, the authentication server sends an access reject message to the access server, e.g. a RADIUS Access Reject. Then the access server may either do nothing and the method ends, or the access server may send a new request to the communication device to enter username and password. After a number of such tries that have not succeeded, the communication device may be banned from entering the restricted data resource 40. For step 218, in case the authentication device ID entered by the user would not match any stored authentication device IDs for the username, the authentication server 50 may send 210 a new request to enter authentication device ID to the communication device 10, via the access server 60, or the authentication process may be aborted.

According to an alternative, the method of FIG. 3 may also comprise displaying 202 by a display unit of the communication device 10, the request to enter a username and a first password, and receiving 204, in response to the displaying 202 and at an input unit of the communication device 10, a username and a password from a user. The password and username are then sent 206 to the authentication server, as described earlier in relation to FIG. 3.

According to another alternative, the method of FIG. 3 may also comprise displaying 212, by the display unit of the communication device 10, the request to enter an authentication device ID, and receiving 214 from the user, at the input unit of the communication device 10 and in response to the displayed request, the authentication device ID. The authentication device ID received from the user is then sent 216 to the authentication server, as described earlier in relation to FIG. 3.

Figure 4:
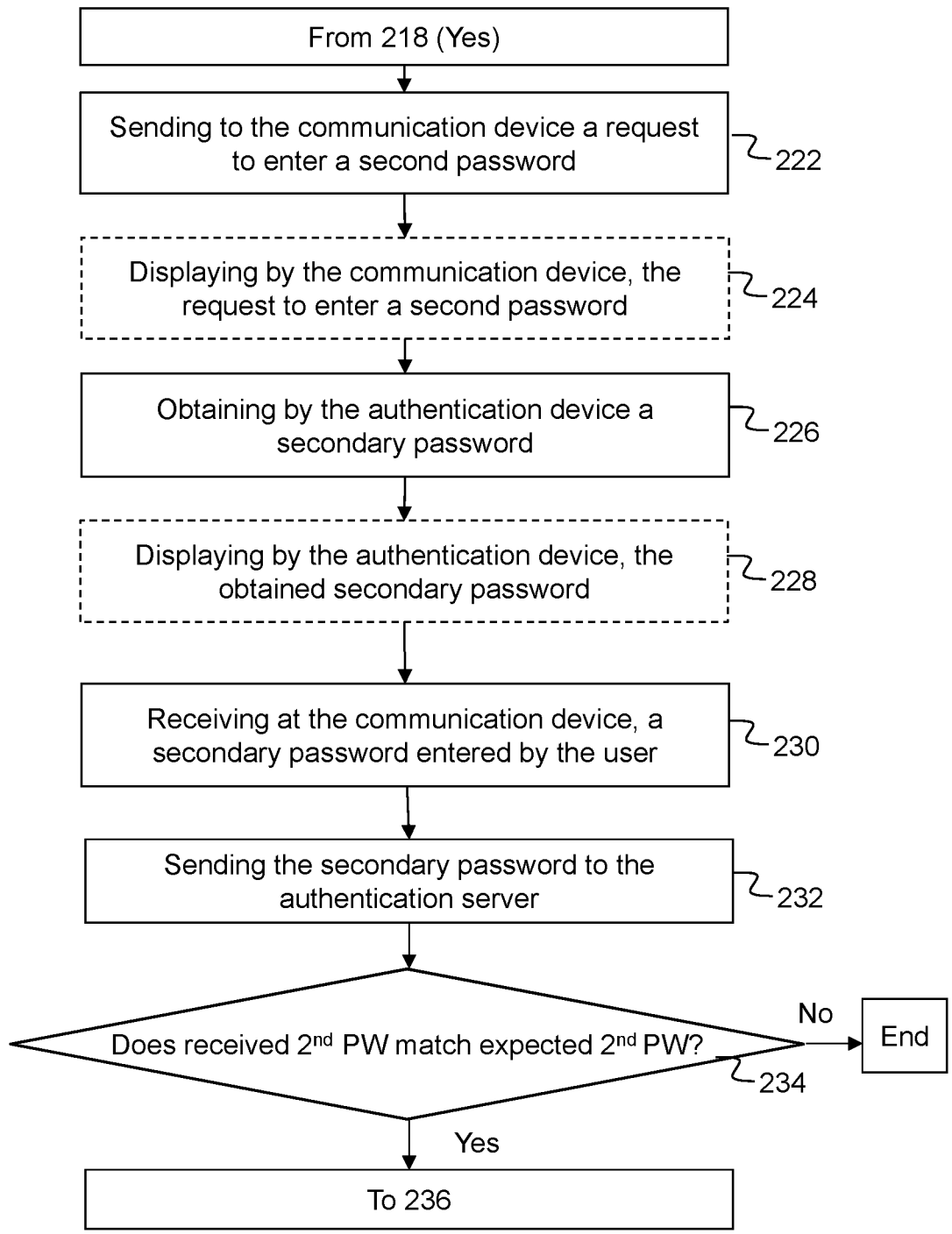
FIG. 4 is a flow chart illustrating an alternative method performed by a system, according to possible embodiments.

FIG. 4 describes an embodiment of the second authentication procedure described above. The second authentication procedure comprises sending 222, by the authentication server 50 to the communication device 10, a request to enter a second password, and obtaining 226, by the authentication device 20, a secondary password that is based on information shared by the authentication device 20 and the authentication server 50, the secondary password being obtained in response to the authentication device ID received from the communication device matching any of the plurality of stored authentication device IDs for the account matching the user name received from the communication device. The second authentication procedure further comprises receiving 230, at an input device of the communication device 10 and in response to the obtaining of the secondary password by the authentication device 20, a secondary password from the user, and sending 232, by the communication device 10 to the authentication server 50, the secondary password received from the user. The second authentication procedure further comprises checking 234, by the authentication server 50, whether the secondary password sent by the communication device 10 matches a secondary password expected by the authentication server 50, and when the secondary password sent by the communication device 10 matches the secondary password expected by the authentication server 50, the user is granted 236 access to the restricted data resource 40. The request to enter a second password sent 222 by the authentication server may be sent as an Access challenge of the RADIUS protocol, prompting the user to enter a second password. The second password and the obtained secondary password may be an OTP.

According to an alternative, the method of FIG. 4 may further comprise displaying 224, by the display unit of the communication device 10, the request to enter a second password and/or displaying 228, by the authentication device 20, the obtained secondary password.

For step 232, in case the received secondary password does not match the secondary password that the server expected to receive, the server may send a 220 a new request to enter a second password, or the authentication process may be aborted.

Figure 5:
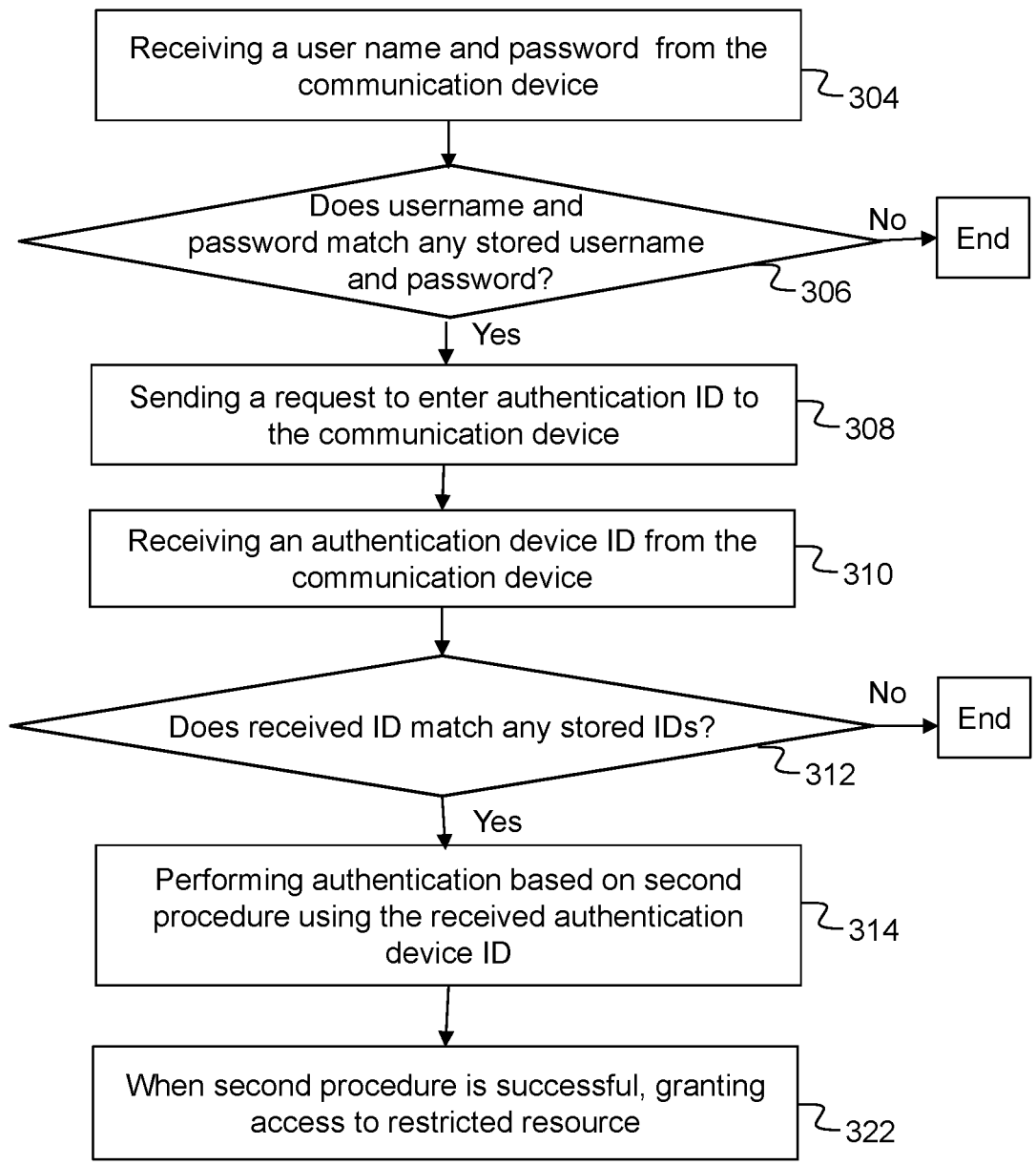
FIG. 5 is a flow chart illustrating a method performed by an authentication server, according to possible embodiments.

FIG. 5, in conjunction with, FIG. 1 describes a method performed by an authentication server 50 for authentication of users requesting access to a restricted data resource 40 from a communication device 10, the authentication server 50 being situated in the restricted data resource 40. Further, communication between the communication device 10 and the authentication server 50 passes via an access server 60, and the RADIUS protocol is used at least for the communication between the authentication server 50 and the access server 60. The method comprises receiving 304 from the communication device 10, a username and a password received from the user in response to a request to enter a username and password for accessing the restricted data resource 40, and triggering checking 306 whether the username received from the communication device matches a stored username of any account of the restricted data resource and whether the password received from the communication device matches a stored password for the account matching the username received from the communication device. The method further comprises sending 308, to the communication device 10 and when the password received from the communication device matches the stored password for the account matching the username received from the communication device, a request to enter an authentication device ID. The method further comprises receiving 310, from the communication device 10, an authentication device ID received from the user in response to the request to enter an authentication device ID, and checking 312 whether the authentication device ID received from the communication device matches any of a plurality of stored authentication device IDs for the account matching the username received from the communication device, and performing authentication 314 of the user based on a second authentication procedure using the authentication device ID received from the communication device, when the authentication device ID received from the communication device matches any of the plurality of stored authentication device IDs for the account matching the user name received from the communication device, and when the second authentication procedure is successful, granting 322 the user access to the restricted data resource.

According to an embodiment, the request to enter an authentication device ID is sent 308 to the communication device as an Access challenge according to a challenge-response mechanism of the RADIUS protocol. Further, the authentication device ID is received 310 from the communication device as a Challenge response to the Access Challenge, according to the RADIUS challenge-response mechanism.

Figure 6:
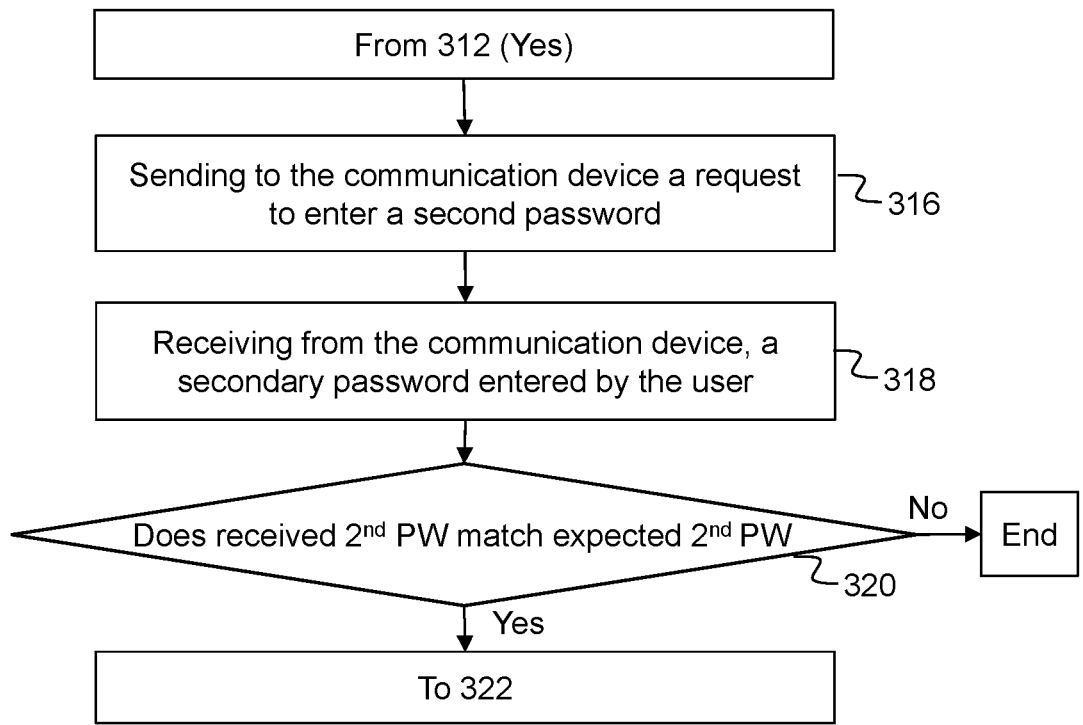
FIG. 6 is a flow chart illustrating an alternative method performed by an authentication server, according to possible embodiments.

FIG. 6, in conjunction with FIG. 1, shows an embodiment of the second authentication procedure. The second authentication procedure comprises sending 316 to the communication device 10, a request to enter a second password, and receiving 318 from the communication device 10, a secondary password received from the user, the secondary password being based on information shared by an authentication device 20 identified by the authentication device ID received from the communication device and the authentication server 50, the secondary password being obtainable for the authentication device (20) when the authentication device ID received from the communication device matches any of the plurality of stored authentication device IDs for the account matching the user name received from the communication device. The method further comprises checking 320 whether the secondary password received from the communication device 10 matches a secondary password expected by the authentication server 50, and when the secondary password received from the communication device 10 matches the secondary password expected by the authentication server 50, the user is granted 322 access to the restricted data resource.

Figure 7:
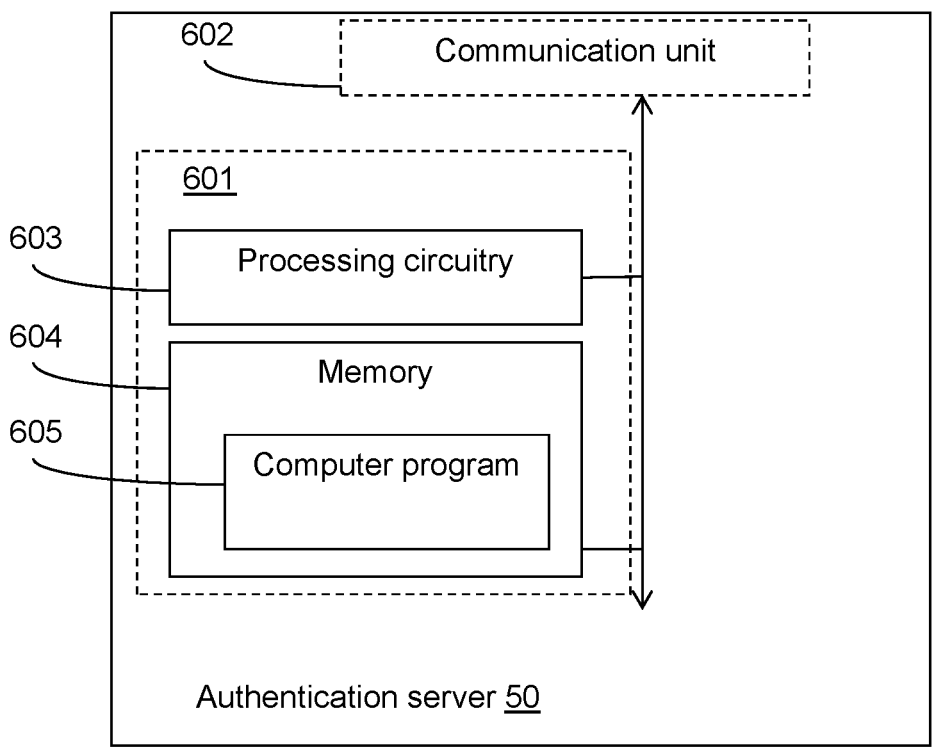
FIG. 7 is a block diagram illustrating an authentication server of FIG. 1 in more detail, according to further possible embodiments.

FIG. 7, in conjunction with FIG. 1, illustrates an authentication server 50 configured for authentication of users requesting access to a restricted data resource 40 from a communication device 10. The authentication server 50 is situated in the restricted data resource 40. Further, communication between the communication device 10 and the authentication server 50 passes via an access server 60. Also, the RADIUS protocol is used at least for the communication between the authentication server 50 and the access server 60. The authentication server 50 comprises a processing circuitry 603 and a memory 604. The memory contains instructions executable by said processing circuitry, whereby the authentication server 50 is operative for receiving, from the communication device 10, a username and a password received from the user in response to a request to enter a username and password for accessing the restricted data resource 40, and triggering checking whether the username received from the communication device matches a stored username of any account of the restricted data resource and whether the password received from the communication device matches a stored password for the account matching the username received from the communication device. Further, the authentication server 50 is operative for sending, to the communication device 10 and when the password received from the communication device matches the stored password for the account matching the username received from the communication device, a request to enter an authentication device ID, receiving, from the communication device 10, an authentication device ID received from the user in response to the request to enter an authentication device ID, and checking whether the authentication device ID received from the communication device matches any of a plurality of stored authentication device IDs for the account matching the username received from the communication device. Further, the authentication server 50 is operative for performing authentication of the user based on a second authentication procedure using the authentication device ID received from the communication device, when the authentication device ID received from the communication device matches any of the plurality of stored authentication device IDs for the account matching the user name received from the communication device, and when the second authentication procedure is successful, granting the user access to the restricted data resource.

According to an embodiment, the authentication server 50 is operative for sending the request to enter an authentication device ID to the communication device 10 as an Access challenge according to a challenge-response mechanism of the RADIUS protocol. The authentication server is further operative for receiving the authentication device ID from the communication device as a Challenge response to the Access Challenge, according to the RADIUS challenge-response mechanism.

According to another embodiment, the authentication server 50 is operative for performing the second authentication procedure by sending to the communication device 10, a request to enter a second password, and receiving from the communication device 10, a secondary password received from the user, the secondary password being based on information shared by an authentication device 20 identified by the authentication device ID received from the communication device and the authentication server 50, the secondary password being obtainable for the authentication device 20 when the authentication device ID received from the communication device matches any of the plurality of stored authentication device IDs for the account matching the user name received from the communication device. The authentication server 50 is further operative for performing the second authentication procedure by checking whether the secondary password received from the communication device 10 matches a secondary password expected by the authentication server 50, and when the secondary password received from the communication device 10 matches the secondary password expected by the authentication server 50, granting the user access to the restricted data resource 40.

According to other embodiments, the authentication server 50 may further comprise a communication unit 602, which may be considered to comprise conventional means for communication with the access server 40 and further to nodes and devices outside the restricted data resource, such as the communication device 10, via the access server and the communication network 30. The instructions executable by said processing circuitry 603 may be arranged as a computer program 605 stored e.g. in said memory 604. The processing circuitry 603 and the memory 604 may be arranged in a sub-arrangement 601. The sub-arrangement 601 may be a micro-processor and adequate software and storage therefore, a Programmable Logic Device, PLD, or other electronic component(s)/processing circuit(s) configured to perform the methods mentioned above. The processing circuitry 603 may comprise one or more programmable processor, application-specific integrated circuits, field programmable gate arrays or combinations of these adapted to execute instructions.

The computer program 605 may be arranged such that when its instructions are run in the processing circuitry, they cause the authentication server 50 to perform the steps described in any of the described embodiments of the authentication server 50 and its method. The computer program 605 may be carried by a computer program product connectable to the processing circuitry 603. The computer program product may be the memory 604, or at least arranged in the memory. The memory 604 may be realized as for example a RAM (Random-access memory), ROM (Read-Only Memory) or an EEPROM (Electrical Erasable Programmable ROM). In some embodiments, a carrier may contain the computer program 605.

Although the description above contains a plurality of specificities, these should not be construed as limiting the scope of the concept described herein but as merely providing illustrations of some exemplifying embodiments of the described concept. It will be appreciated that the scope of the presently described concept fully encompasses other embodiments which may become obvious to those skilled in the art, and that the scope of the presently described concept is accordingly not to be limited. Reference to an element in the singular is not intended to mean "one and only one" unless explicitly so stated, but rather "one or more." All structural and functional equivalents to the elements of the above-described embodiments that are known to those of ordinary skill in the art are expressly incorporated herein by reference and are intended to be encompassed hereby. Moreover, it is not necessary for an apparatus or method to address each and every problem sought to be solved by the presently described concept, for it to be encompassed hereby. In the exemplary figures, a broken line generally signifies that the feature within the broken line is optional.

The invention claimed is:

1. A method performed by a system for authentication of users requesting access to a restricted data resource from a communication device, the system comprising an authentication server situated in the restricted data resource, an access server, the communication device, and an authentication device, wherein communication between the communication device and the authentication server passes via the access server, wherein the Remote Authentication Dial-In User Service(RADIUS) protocol is used at least for the communication between the authentication server and the access server, the method comprising:

sending, by the communication device to the authentication server, a username and a password received from a user of the communication device in response to a request to enter a username and password for accessing the restricted data resource;

triggering checking, by the authentication server, whether the username received from the communication device matches a stored username of any account of the restricted data resource and whether the password received from the communication device matches a stored password for the account matching the username entered by the communication device, wherein the account is a shared account whereby multiple users using different communication devices can access the restricted data resource using the username and password associated with the account, sending, by the authentication server to the communication device and when the password received from the communication device matches the stored password for the account matching the username received from the communication device, a request to enter an authentication device identifier (ID) of an authentication device to be used for a second authentication procedure, sending, by the communication device to the authentication server, an authentication device ID received from the user in response to the request to enter an authentication device ID;

checking, by the authentication server, whether the authentication device ID received from the communication device matches any of a plurality of stored authentication device IDs for the account matching the username received from the communication device;

performing authentication of the user based on the second authentication procedure using the authentication device ID received from the communication device, when the authentication device ID received from the communication device matches any of the plurality of stored authentication device IDs for the account matching the user name received from the communication device, wherein the authentication is performed by the authentication server initiating the second authentication procedure using the authentication device ID received from the communication device; and when the second authentication procedure is successful, granting by the authentication server, the user access to the restricted data resource.

2. A method according to claim 1, wherein the request to enter an authentication device ID is sent by the authentication server as an Access challenge according to a challenge-response mechanism of the RADIUS protocol, and wherein the authentication device ID sent by the communication device to the authentication server is received by the authentication server as a Challenge response to the Access Challenge, according to the RADIUS challenge-response mechanism.

3. A method according to claim 1, wherein the second authentication procedure comprises:

sending, by the authentication server to the communication device, a request to enter a second password, obtaining, by the authentication device, a secondary password that is based on information shared by the authentication device and the authentication server, the secondary password being obtained in response to the authentication device ID received from the communication device matching any of the plurality of stored authentication device IDs for the account matching the user name received from the communication device, receiving, at an input device of the communication device and in response to the obtaining of the secondary password by the authentication device, a secondary password from the user, sending, by the communication device to the authentication server, the secondary password received from the user, checking, by the authentication server, whether the secondary password sent by the communication device matches a secondary password expected by the authentication server, and when the secondary password sent by the communication device matches the secondary password expected by the authentication server, the user is granted access to the restricted data resource.

4. A method performed by an authentication server for authentication of users requesting access to a restricted data resource from a communication device, the authentication server being situated in the restricted data resource, wherein communication between the communication device and the authentication server passes via an access server, wherein the RADIUS protocol is used at least for the communication between the authentication server and the access server, the method comprising:

receiving from the communication device, a username and a password received from the user in response to a request to enter a username and password for accessing the restricted data resource;

triggering checking whether the username received from the communication device matches a stored username of any account of the restricted data resource and whether the password received from the communication device matches a stored password for the account matching the username received from the communication device, wherein the account is a shared account whereby multiple users using different communication devices can access the restricted data resource using the username and password associated with the account;

sending, to the communication device and when the password received from the communication device matches the stored password for the account matching the username received from the communication device, a request to enter an authentication device ID of an authentication device to be used for a second authentication procedure;

receiving, from the communication device, an authentication device ID received from the user in response to the request to enter an authentication device ID;

checking whether the authentication device ID received from the communication device matches any of a plurality of stored authentication device IDs for the account matching the username received from the communication device;

performing authentication of the user based on the second authentication procedure using the authentication device ID received from the communication device, when the authentication device ID received from the communication device matches any of the plurality of stored authentication device IDs for the account matching the user name received from the communication device, wherein the authentication is performed by the authentication server initiating the second authentication procedure using the authentication device ID received from the communication device; and when the second authentication procedure is successful, granting the user access to the restricted data resource.

5. A method according to claim 4, wherein the request to enter an authentication device ID is sent to the communication device as an Access challenge according to a challenge-response mechanism of the RADIUS protocol, and wherein the authentication device ID is received from the communication device as a Challenge response to the Access Challenge, according to the RADIUS challenge-response mechanism.

6. A method according to claim 4, wherein the second authentication procedure comprises:

sending to the communication device, a request to enter a second password, receiving from the communication device, a secondary password received from the user, the secondary password being based on information shared by an authentication device identified by the authentication device ID received from the communication device and the authentication server, the secondary password being obtainable for the authentication device when the authentication device ID received from the communication device matches any of the plurality of stored authentication device IDs for the account matching the user name received from the communication device, checking whether the secondary password received from the communication device matches a secondary password expected by the authentication server, and when the secondary password received from the communication device matches the secondary password expected by the authentication server, the user is granted access to the restricted data resource.

7. An authentication server configured for authentication of users requesting access to a restricted data resource from a communication device, the authentication server being situated in the restricted data resource, wherein communication between the communication device and the authentication server passes via an access server, wherein the RADIUS protocol is used at least for the communication between the authentication server and the access server, the authentication server comprising a processing circuitry and a memory, said memory containing instructions executable by said processing circuitry, whereby the authentication server is operative for:

receiving, from the communication device, a username and a password received from the user in response to a request to enter a username and password for accessing the restricted data resource;

triggering checking whether the username received from the communication device matches a stored username of any account of the restricted data resource and whether the password received from the communication device matches a stored password for the account matching the username received from the communication device, wherein the account is a shared account whereby multiple users using different communication devices can access the restricted data resource using the username and password associated with the account;

sending, to the communication device and when the password received from the communication device matches the stored password for the account matching the username received from the communication device, a request to enter an authentication device ID of an authentication device to be used for a second authentication procedure;

receiving, from the communication device, an authentication device ID received from the user in response to the request to enter an authentication device ID;

checking whether the authentication device ID received from the communication device matches any of a plurality of stored authentication device IDs for the account matching the username received from the communication device;

performing authentication of the user based on the second authentication procedure using the authentication device ID received from the communication device, when the authentication device ID received from the communication device matches any of the plurality of stored authentication device IDs for the account matching the user name received from the communication device, wherein the authentication is performed by the authentication server initiating the second authentication procedure using the authentication device ID received from the communication device; and when the second authentication procedure is successful, granting the user access to the restricted data resource.

8. An authentication server according to claim 7, operative for sending the request to enter an authentication device ID to the communication device as an Access challenge according to a challenge-response mechanism of the RADIUS protocol, and for receiving the authentication device ID from the communication device as a Challenge response to the Access Challenge, according to the RADIUS challenge-response mechanism.

9. An authentication server according to claim 7, operative for performing the second authentication procedure by:

sending to the communication device, a request to enter a second password, receiving from the communication device, a secondary password received from the user, the secondary password being based on information shared by an authentication device identified by the authentication device ID received from the communication device and the authentication server, the secondary password being obtainable for the authentication device when the authentication device ID received from the communication device matches any of the plurality of stored authentication device IDs for the account matching the user name received from the communication device, checking whether the secondary password received from the communication device matches a secondary password expected by the authentication server, and when the secondary password received from the communication device matches the secondary password expected by the authentication server, granting the user access to the restricted data resource.

* * * * *